US012619227B2

(12) United States Patent
Singhal et al.

(10) Patent No.: US 12,619,227 B2
(45) Date of Patent: May 5, 2026

(54) METHOD AND SYSTEM FOR CAUSAL INFERENCE AND ROOT CAUSE IDENTIFICATION IN INDUSTRIAL PROCESSES

(71) Applicant: Tata Consultancy Services Limited, Mumbai (IN)

(72) Inventors: Tanmaya Singhal, Pune (IN); Kalyani Bharat Zope, Pune (IN); Sri Harsha Nistala, Pune (IN); Venkataramana Runkana, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 405 days.

(21) Appl. No.: 18/348,983

(22) Filed: Jul. 7, 2023

(65) Prior Publication Data

US 2024/0028026 A1 Jan. 25, 2024

(30) Foreign Application Priority Data

Jul. 21, 2022 (IN) .............................. 202221041919

(51) Int. Cl.
*G05B 23/02* (2006.01)
(52) U.S. Cl.
CPC ..... *G05B 23/0283* (2013.01); *G05B 23/0248* (2013.01); *G05B 23/0272* (2013.01)
(58) Field of Classification Search
CPC .............. G05B 23/024; G05B 23/0248; G05B 23/0272; G05B 23/0275; G05B 23/0281; G05B 23/0283

(Continued)

(56) References Cited

U.S. PATENT DOCUMENTS 10,223,403 B2 * 3/2019 Malhotra ................. G06N 3/09
10,719,774 B2 * 7/2020 Malhotra ............ G06F 11/3452
(Continued)

OTHER PUBLICATIONS

Chatterjee, Joyjit et al., "Temporal Causal Inference in Wind Turbine SCADA Data Using Deep Learning for Explainable AI", Title of the item: Journal of Physics: Conference Series, Date: 2020, Publisher: IOP Publishing Ltd, https://iopscience.iop.org/article/10.1088/1742-6596/1618/2/022022/pdf.

(Continued)

*Primary Examiner* — John H Le
(74) *Attorney, Agent, or Firm* — Finnegan, Henderson, Farabow, Garrett & Dunner, LLP

(57) ABSTRACT

Fault diagnosis in industries typically involves identification of key variables/sensors bearing fault signature, classification of detected fault into known fault classes and detecting root causes/sources of the fault. This disclosure relates to a method and system for a deep learning based causal inference in a multivariate time series data of abnormal events and failures in industrial manufacturing processes and equipment. The system generates causal networks for non-linear and non-stationary multivariate time series data. The causal network learns for a dynamic non-stationary and nonlinear complex process or system fault using observed data without any prior process knowledge. The causal networks of faults are identified in real-time using a deep learning-based causal network learning technique. The system identifies causal connections and temporal lag information among variables to generate a directed causal graph of fault called the causal network, which is used to identify fault propagation paths and root cause variables.

20 Claims, 6 Drawing Sheets

(58) Field of Classification Search
USPC .......................................................... 702/184
See application file for complete search history.

(56) References Cited

U.S. PATENT DOCUMENTS

| | | | | |
|---|---|---|---|---|
| 2019/0318288 | A1* | 10/2019 | Noskov | .................... G06N 7/01 |
| 2021/0142161 | A1 | 5/2021 | Huang et al. | |
| 2023/0069074 | A1* | 3/2023 | Chen | ................... G06F 11/3409 |

OTHER PUBLICATIONS

Koutlis, Christos et al., "Lavarnet: Neural Network Modeling of Causal Variable Relationships for Multivariate Time Series Forecasting", Title of the item: Applied Soft Computing, Date: 2020, Publisher: Elsevier, Link: https://arxiv.org/pdf/2009.00945.pdf.

* cited by examiner

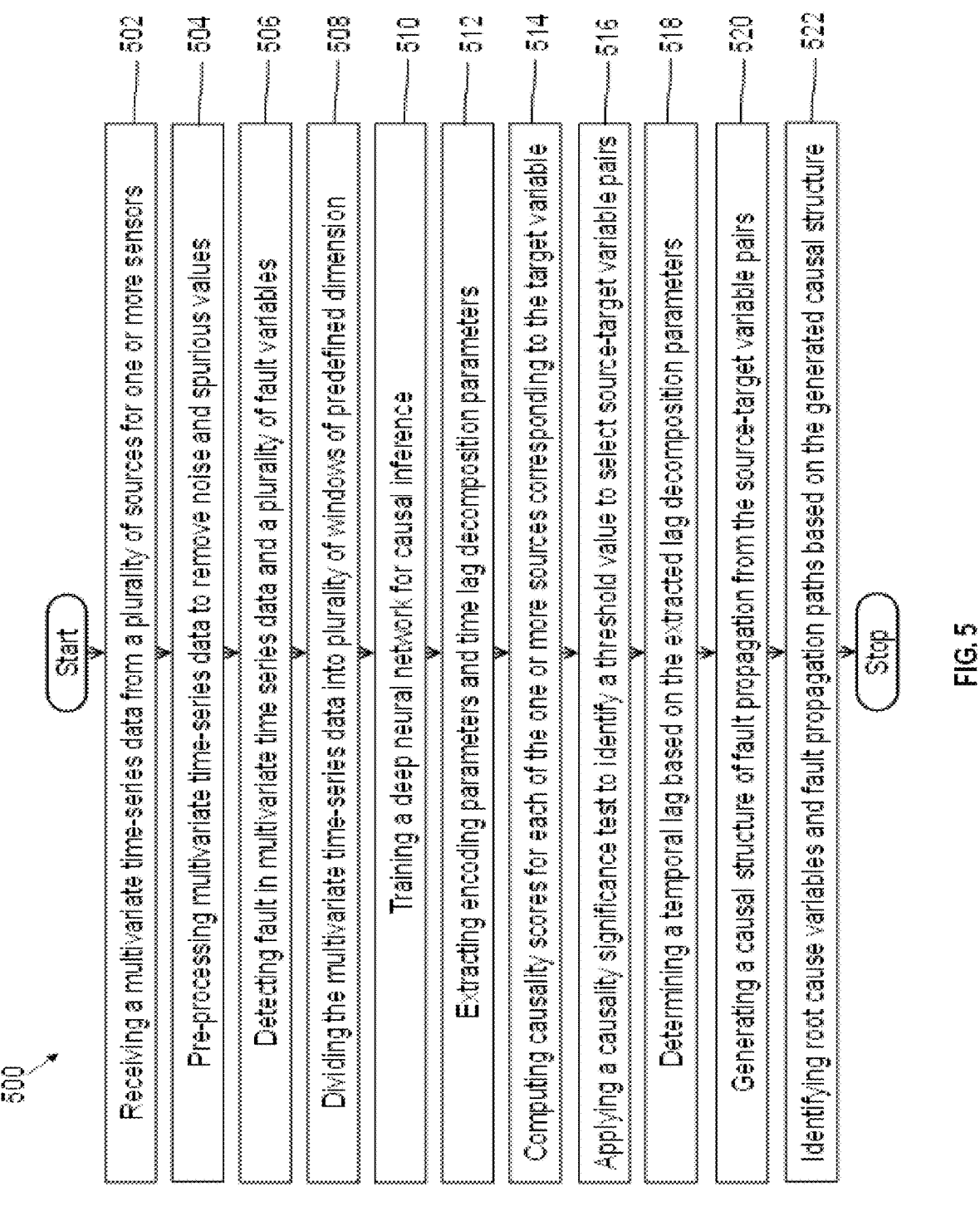

500

Start

Receiving a multivariate time-series data from a plurality of sources for one or more sensors — 502

Pre-processing multivariate time-series data to remove noise and spurious values — 504

Detecting fault in multivariate time series data and a plurality of fault variables — 506

Dividing the multivariate time-series data into plurality of windows of predefined dimension — 508

Training a deep neural network for causal inference — 510

Extracting encoding parameters and time lag decomposition parameters — 512

Computing causality scores for each of the one or more sources corresponding to the target variable — 514

Applying a causality significance test to identify a threshold value to select source-target variable pairs — 516

Determining a temporal lag based on the extracted lag decomposition parameters — 518

Generating a causal structure of fault propagation from the source-target variable pairs — 520

Identifying root cause variables and fault propagation paths based on the generated causal structure — 522

Stop

FIG. 5

METHOD AND SYSTEM FOR CAUSAL INFERENCE AND ROOT CAUSE IDENTIFICATION IN INDUSTRIAL PROCESSES

CROSS-REFERENCE TO RELATED APPLICATIONS AND PRIORITY

This U.S. patent application claims priority under 35 U.S.C. § 119 to Indian Application number 202221041919, filed on Jul. 21, 2022. The entire contents of the aforementioned application are incorporated herein by reference.

TECHNICAL FIELD

The disclosure herein generally relates to the field of industrial data analytics and specifically, to a method and system for a causal network learning and identifying one or more root cause variables and one or more fault propagation paths for faults in industrial processes and equipment.

BACKGROUND

Effective fault detection and diagnosis is a key step towards predictive and prescriptive maintenance of industrial processes and equipment. Here, fault diagnosis is an umbrella term that typically involves identification of key variables/sensors bearing the fault signature (fault localization/isolation), classification of the detected fault into one or more known fault classes (fault classification) and detecting the root cause/source of the fault (causality or RCA). Of these, real-time root cause identification of faults or abnormal events is a key ask from industries as it gives plant operators and managers an opportunity to address the problem in real-time before the fault progresses and leads to a failure. For example, in coke oven batteries, whenever there is a change in coke quality (process fault), operators would want to know if it is due to changes in coking parameters, health of the coke ovens or the chemical composition of coal blend so that appropriate corrective action can be taken.

Considering the growing need for real-time process monitoring and reliable fault detection and diagnosis in industries and given the large number of process variables, it is not practical for domain experts or plant operators to localize the fault or identify the causal network of variables responsible for the fault in real-time. Most of the time, causal networks are generated using prior process knowledge or manually by subject matter experts (SMEs). There are two types of approaches for learning causal networks and root cause identification (RCI) of faults, namely knowledge-based and data-driven approaches. Knowledge-based methods (such as FMEA) require apriori knowledge of faults/failures and the relationship between faults and observations (symptoms). While such knowledge can be derived from fundamental understanding of the process, sources of domain knowledge and experience with the process, the initial effort required for this approach is significant and the gathered knowledge may not be exhaustive leading to missed or incorrect identifications in some cases. On the other hand, data-driven methods rely entirely on historical and current operating data and can be applied with minimum initial effort. However, existing data-driven techniques cannot effectively identify nonlinear relationships among the variables and cannot deal with non-stationarity in the data. Therefore, these techniques are not effective for learning causal networks of nonlinear and nonstationary industrial processes.

SUMMARY

Embodiments of the disclosure present technological improvements as solutions to one or more of the above-mentioned technical problems recognized by the inventors in conventional systems. For example, in one embodiment, a system and method for causal network learning and identifying one or more root cause variables and one or more fault propagation paths for faults in industrial processes is provided.

In one aspect, a processor-implemented method for causal network learning and identifying one or more root cause variables and one or more fault propagation paths for faults in industrial processes is provided. The processor-implemented method includes one or more steps such as receiving a multivariate time-series data of one or more sensors from a plurality of sources, pre-processing the received multivariate time-series data using a plurality of pre-processing techniques to remove noise and spurious values, imputing/interpolating missing values of the plurality of received data and resampling the received multivariate time series data to a uniform frequency. Further, the processor-implemented method detecting at least one fault in the pre-processed multivariate time series data and a plurality of fault variables responsible for the at least one fault using a fault detection and diagnosis technique, dividing the preprocessed multivariate time-series data of the plurality of fault variables along the time axis into a plurality of windows of a predefined dimension, training a deep neural network for causal inference using each of the plurality of windows and a stochastic proximal gradient descent (SPGD) technique with an adaptive learning rate, extracting one or more encoding parameters from one or more encoding layers of the deep neural network and one or more lag decomposition parameters from one or more lag decomposition layers of the deep neural network, computing causality scores for each of the one or more sources corresponding to the target variable using Frobenius norm of one or more encoding parameters to obtain causality score for one or more source-target variable pairs, applying a causality significance test on the computed one or more causality scores to identify a threshold value and select one or more source-target variable pairs having a causality score above the identified threshold in the multivariate time-series data, determining a temporal lag based on a contribution to the lag decomposition parameters corresponding to each of the one or more selected source-target variable pairs having a causality score above the threshold, generating a causal structure of fault propagation from the selected one or more source-target variable pairs and the determined temporal lags and identifying one or more root cause variables and one or more fault propagation paths based on traversing the generated causal structure.

In another aspect, a system for causal network learning and identifying one or more root cause variables and one or more fault propagation paths for faults in industrial processes is provided. The system includes an input/output interface configured to receive a multivariate time-series data of one or more sensors from a plurality of sources and preprocessing the received multivariate time-series data using a plurality of pre-processing techniques to remove noise and spurious values, imputing/interpolating missing values of the plurality of received data and resampling the received multivariate time series data to a uniform frequency. Further, the system is configured to detect at least one fault in the pre-processed multivariate time series data and a plurality of fault variables responsible for the at least one fault using a fault detection and diagnosis technique, divide the preprocessed multivariate time-series data of the plurality of fault variables along the time axis into a plurality of windows of a predefined dimension, train a deep neural network for causal inference using each of the plurality of windows and a stochastic proximal gradient descent (SPGD) technique with an adaptive learning rate, extract one or more encoding parameters from one or more encoding layers of the deep neural network and one or more lag decomposition parameters from one or more lag decomposition layers of the deep neural network, compute causality scores for each of the one or more sources corresponding to the target variable using Frobenius norm of one or more encoding parameters to obtain causality score for one or more source-target variable pairs, apply a causality significance test on the computed one or more causality scores to identify a threshold value and select one or more source-target variable pairs having a causality score above the identified threshold in the multivariate time-series data, determine a temporal lag based on a contribution to the lag decomposition parameters corresponding to each of the one or more selected source-target variable pairs having a causality score above the threshold, generate a causal structure of fault propagation from the selected one or more source-target variable pairs and the determined temporal lags and identify one or more root cause variables and one or more fault propagation paths based on traversing the generated causal structure.

In yet another aspect, one or more non-transitory machine-readable information storage mediums are provided comprising one or more instructions, which when executed by one or more hardware processors causes a method of causal network learning and identifying one or more root cause variables and one or more fault propagation paths for faults in industrial processes is provided. The processor-implemented method includes one or more steps such as receiving a multivariate time-series data of one or more sensors from a plurality of sources and preprocessing the received multivariate time-series data using a plurality of pre-processing techniques to remove noise and spurious values, imputing/interpolating missing values of the plurality of received data and resampling the received multivariate time series data to a uniform frequency. Further, the pro-cessor-implemented method detecting at least one fault in the pre-processed multivariate time series data and a plurality of fault variables responsible for the at least one fault using a fault detection and diagnosis technique, dividing the preprocessed multivariate time-series data of the plurality of fault variables along the time axis into a plurality of windows of a predefined dimension, training a deep neural network for causal inference using each of the plurality of windows and a stochastic proximal gradient descent (SPGD) technique with an adaptive learning rate, extracting one or more encoding parameters from one or more encoding layers of the deep neural network and one or more lag decomposition parameters from one or more lag decomposition layers of the deep neural network, computing causal-ity scores for each of the one or more sources corresponding to the target variable using Frobenius norm of one or more encoding parameters to obtain causality score for one or more source-target variable pairs, applying a causality sig-nificance test on the computed one or more causality scores to identify a threshold value and select one or more source-target variable pairs having a causality score above the identified threshold in the multivariate time-series data, determining a temporal lag based on a contribution to the lag decomposition parameters corresponding to each of the one or more selected source-target variable pairs having a cau-sality score above the threshold, generating a causal structure of fault propagation from the selected one or more source-target variable pairs and the determined temporal lags and identifying one or more root cause variables and one or more fault propagation paths based on traversing the generated causal structure.

It is to be understood that both the foregoing general description and the following detailed description are exem-plary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 5 illustrates a processor-implemented method for causal network learning and identifying one or more root cause variables and one or more fault propagation paths for faults in industrial processes, in accordance with some embodiments of the present disclosure.

FIG. 6(a) represents the weight matrix where each value in the matrix represents the magnitude of significant causal contribution between source and target variables. FIG. 6(b) illustrates the obtained causal network, in accordance with some embodi-ments of the present disclosure.

Figure 1:
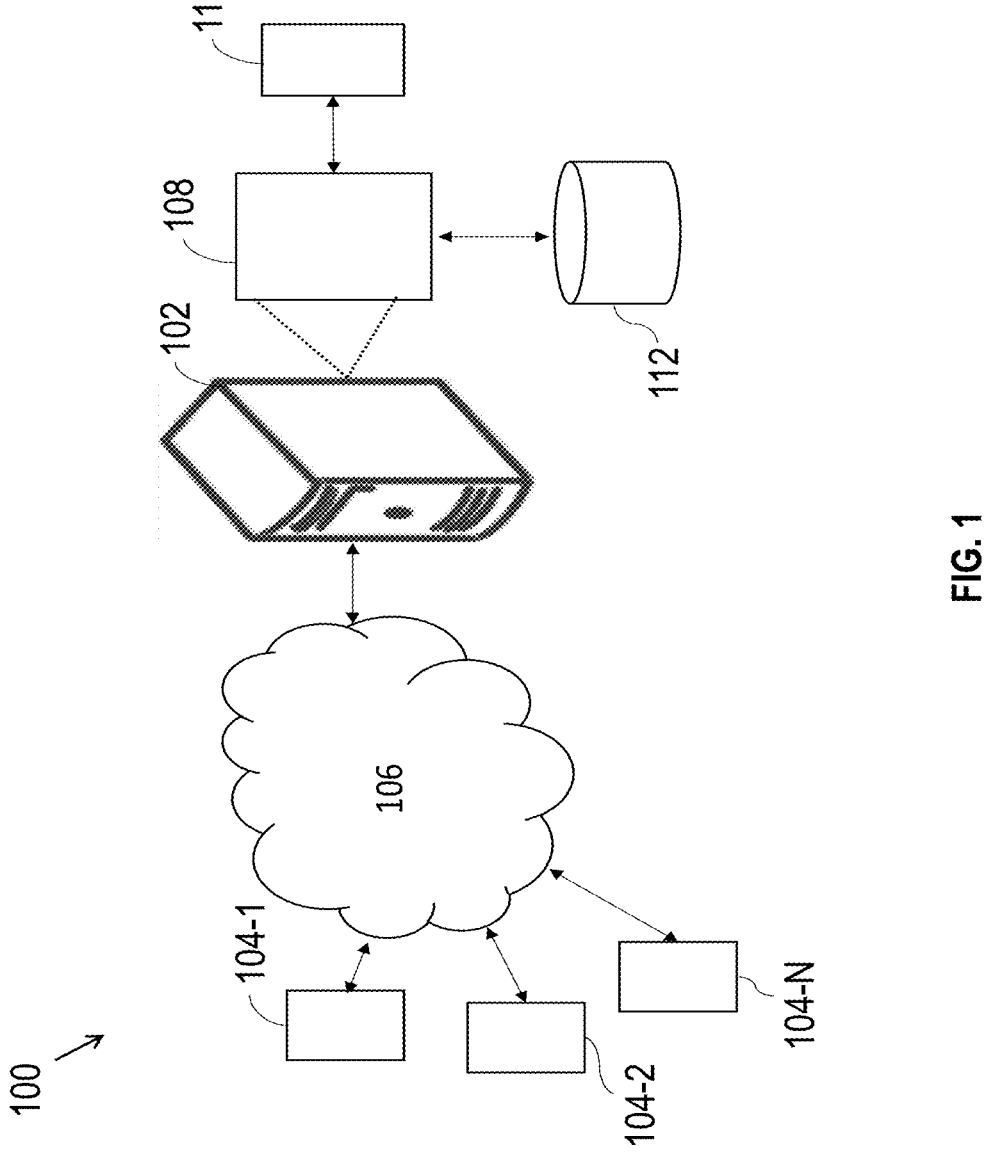
FIG. 1 illustrates an exemplary system for causal network learning and identifying one or more root cause variables and one or more fault propagation paths for faults in industrial processes and equipment, in accordance with some embodiments of the present disclosure.

It should be appreciated by those skilled in the art that any block diagrams herein represent conceptual views of illus-trative systems and devices embodying the principles of the present subject matter. Similarly, it will be appreciated that any flow charts, flow diagrams, and the like represent various processes, which may be substantially represented in computer readable medium and so executed by a computer or processor, whether or not such computer or processor is explicitly shown.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the draw-ings to refer to the same or like parts. While examples and features of disclosed principles are described herein, modi-fications, adaptations, and other implementations are pos-sible without departing from the spirit and scope of the disclosed embodiments. It is intended that the following detailed description be considered as exemplary only, with the true scope and spirit being indicated by the following claims.

There is a growing need for real-time monitoring and reliable fault detection and diagnosis in industries. In case of a fault/failure, given the large number of process variables, it is not practical for domain experts or plant operators to identify causal chain that led to the fault and pin-point the root causes. There are broadly two approaches to root cause identification, namely knowledge-based and data-driven approaches. Knowledge-based methods (such as FMEA) require a priori knowledge of faults/failures and the relationship between faults and observations (symptoms). While such knowledge can be derived from fundamental understanding of the process, sources of domain knowledge and experience with the process, the initial effort required for this approach is significant and the gathered knowledge may not be exhaustive leading to missed identifications in some cases. On the other hand, data-driven methods rely entirely on historical and current operating data and can be applied with minimum initial effort.

The embodiments herein provide a method and system for identifying one or more root cause variables and one or more fault propagation paths for faults in industrial processes. The present invention is a method and system for real-time causal network learning for manufacturing processes and equipment faults. One of the aspects of disclosure is to learn the causal network (graph structure) for a dynamic non-stationary and nonlinear complex process or system fault using observed data without any prior process knowledge. The causal networks of faults are identified in real-time using a deep learning-based causal network learning technique.

Referring now to the drawings, and more particularly to FIG. 1 through 5, where similar reference characters denote corresponding features consistently throughout the figures, there are shown preferred embodiments and these embodiments are described in the context of the following exemplary system and/or method.

FIG. 1 illustrates an exemplary system (100) for causal network learning and identifying one or more root cause variables and one or more fault propagation paths for faults in industrial processes and equipment, in accordance with an example embodiment. Although the present disclosure is explained considering that the system (100) is implemented on a server, it may be understood that the system (100) may comprises one or more computing devices (102), such as a laptop computer, a desktop computer, a notebook, a workstation, a cloud-based computing environment and the like. It will be understood that the system 100 may be accessed through one or more input/output interfaces 104-1, 104-2 . . . 104-N, collectively referred to as I/O interface (104). Examples of the I/O interface (104) may include, but are not limited to, a user interface, a portable computer, a personal digital assistant, a handheld device, a smartphone, a tablet computer, a workstation, and the like. The I/O interface (104) are communicatively coupled to the system (100) through a network (106).

In an embodiment, the network (106) may be a wireless or a wired network, or a combination thereof. In an example, the network (106) can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network (106) may include a variety of network devices, including routers, bridges, servers, computing devices, storage devices. The network devices within the network (106) may interact with the system (100) through communication links.

The system (100) supports various connectivity options such as BLUETOOTH®, USB, ZigBee and other cellular services. The network environment enables connection of various components of the system (100) using any communication link including Internet, WAN, MAN, and so on. In an exemplary embodiment, the system (100) is implemented to operate as a stand-alone device. In another embodiment, the system (100) may be implemented to work as a loosely coupled device to a smart computing environment. The components and functionalities of the system (100) are described further in detail.

Figure 2:
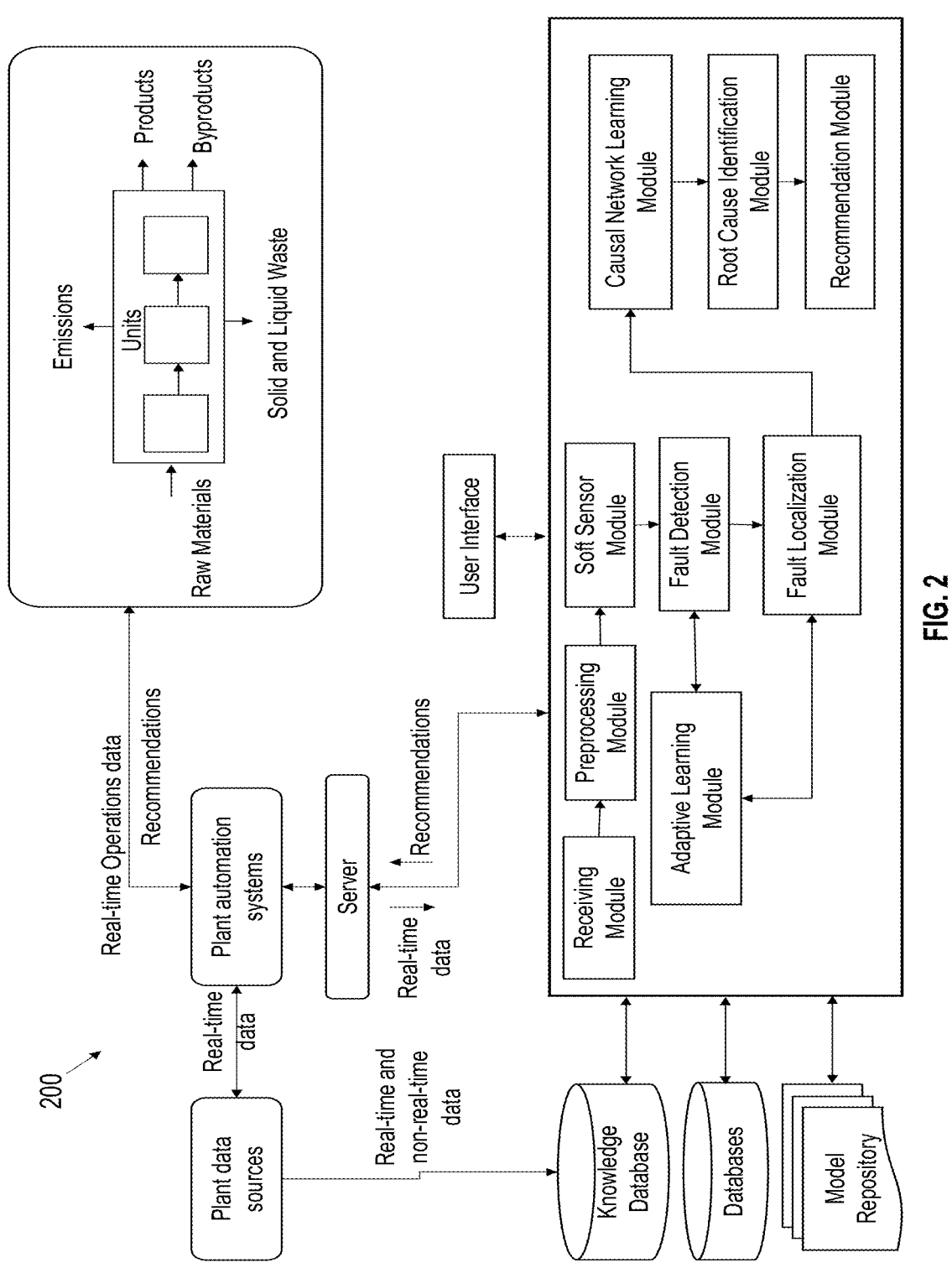
FIG. 2 illustrates an schematic diagram illustrating com-ponents of the system for a causal network learning (CNL) for causal inference in industrial manufacturing processes and equipment, in accordance with some embodiments of the present disclosure.

FIG. 2 is a schematic diagram (200) illustrating the components of the system (100) for a causal network learning (CNL) for causal inference and root cause identification (RCI) in industrial manufacturing processes and equipment, in accordance with some embodiments of the present disclosure. The system (100) comprises a plurality of modules for performing various functions. It comprises a plurality of industrial plant data sources, a plant automation system or distributed control system (DCS), a server, real-time CNL and RCI modules, a model repository, a knowledge database, and a plurality of databases. It should be appreciated that the knowledge database and the plurality of databases could be the part of the data repository. It would be appreciated that the multivariate time series data from all the databases from industrial plant is brought to the system (100) via the server.

Herein, the input/output interface (104) is configured to receive a plurality of data. The plurality of data includes a real-time and a non-real-time data from various databases at a pre-determined frequency (e.g., 1/second, 1/minute, 1/hour, etc.), where the frequency is configurable by the user. The real-time data includes operations data and environment data. The operations data is recorded by sensors mounted on the industrial assets and includes temperatures, pressures, flow rates, liquid levels, vibrations, etc. from processes and equipment in the units of the industrial plant. The operations data is obtained from a distributed control system (DCS), OPC server, etc. and could be stored in an operations database or historian. The environment data such as ambient temperature, atmospheric pressure, ambient humidity, rainfall, etc. is also recorded by sensors and could be stored in an environment database.

The non-real-time data includes data from the laboratories and maintenance activities. The laboratory data comprises characteristics (e.g., chemical composition, size distribution, concentration, density, viscosity, calorific value, microstructural composition, etc.) of raw materials, products, byproducts, solid and liquid waste, and emissions that are tested at the laboratory. The laboratory data is typically stored and retrieved from a laboratory information management system (LIMS), relational database (RDB) or SQL database. The information related to the condition of the process and equipment, plant running status, maintenance activities performed on the industrial units, etc. is stored and retrieved from a maintenance database.

In another embodiment, the system (100) is configured to preprocess the plurality of data, received from multiple databases of the industrial plant. The pre-processing involves removal of redundant data, unification of sampling frequency, filtering of data, outlier identification & removal, imputation of missing data, synchronization of data by incorporating appropriate lags, and integration of variables from various data sources.

In yet another embodiment, the system (100) is configured to compute a plurality of soft-sensor data using the preprocessed plurality of data of the plurality of industrial assets. It is to be noted that sometimes the direct use of physical sensors may not be possible in some applications or environments due to constraints such as access requirements, extreme operating conditions, disturbances in environment, limitations of the sensors, etc. Further, the information collected from physical sensors may not be sufficient to capture the behavior of the assets. In such cases, soft sensors (either physics-based soft sensors or data-driven soft sensors) are used to generate additional information about the plant. Examples of soft sensors include temperature in the firing zone of a furnace, concentration of product or byproducts inside a reactor, etc. Soft sensors (physics-based and data-driven) are stored in soft sensor database.

In another embodiment, the system (100) is configured to run one or more fault detection models for identifying faulty data instances. The faulty data instances are identified using data-driven models developed using statistical, machine learning and deep learning techniques such as Mahalanobis Distance, principal component analysis (PCA), Local Outlier Factor, Isolation Forest, Elliptic Envelope, One-class Support Vector Machine, K-Nearest Neighbors, artificial neural networks (ANNs) and their variants such as Auto-Encoders (AEs) including LSTM-AE, Dense-AE and CNN-AE.

Using real-time data and fault detection models, a fault score is predicted for the current time as well as forecasted for future time instances (e.g., next 1 hour). If a fault is detected using the forecasted fault score, then fault localization, generation of causal structure(s) and identification of root cause variables can be done in advance and appropriate recommendations related to shut down, maintenance or optimization can be provided to the operators. The detected faulty data instances are used by the system (100) to identify variables responsible for the detected fault. Further, the fault localization is carried out for the faulty instances and candidate variables carrying the signature of abnormal event/faults are identified. Complete decomposition contribution (CDC), leave-one-variable-out (LOVO) and reconstruction error-based fault localization techniques are used for identifying the candidate faulty variables along with their contribution scores to the fault.

The adaptive learning module of the system (100) is configured to retrain the fault detection and localization models based on newer process and equipment data in case of performance degradation of the models due to changes in raw materials, operating strategy of the plant or wear and tear of the equipment with time.

The identified list of faulty variables and the data corresponding to these variables are sent to the causal network learning module of the system (100) to learn a causal network of fault propagation. The root cause identification module of the system (100) is configured to identify fault propagation paths and root cause variables for the fault by visual inspection or by traversing the causal network using graph traversal techniques.

The recommendation Module of the system (100) is configured to suggest one or more corrective actions to the plant personnel based on the identified root cause variables and fault propagation paths.

Figure 3:
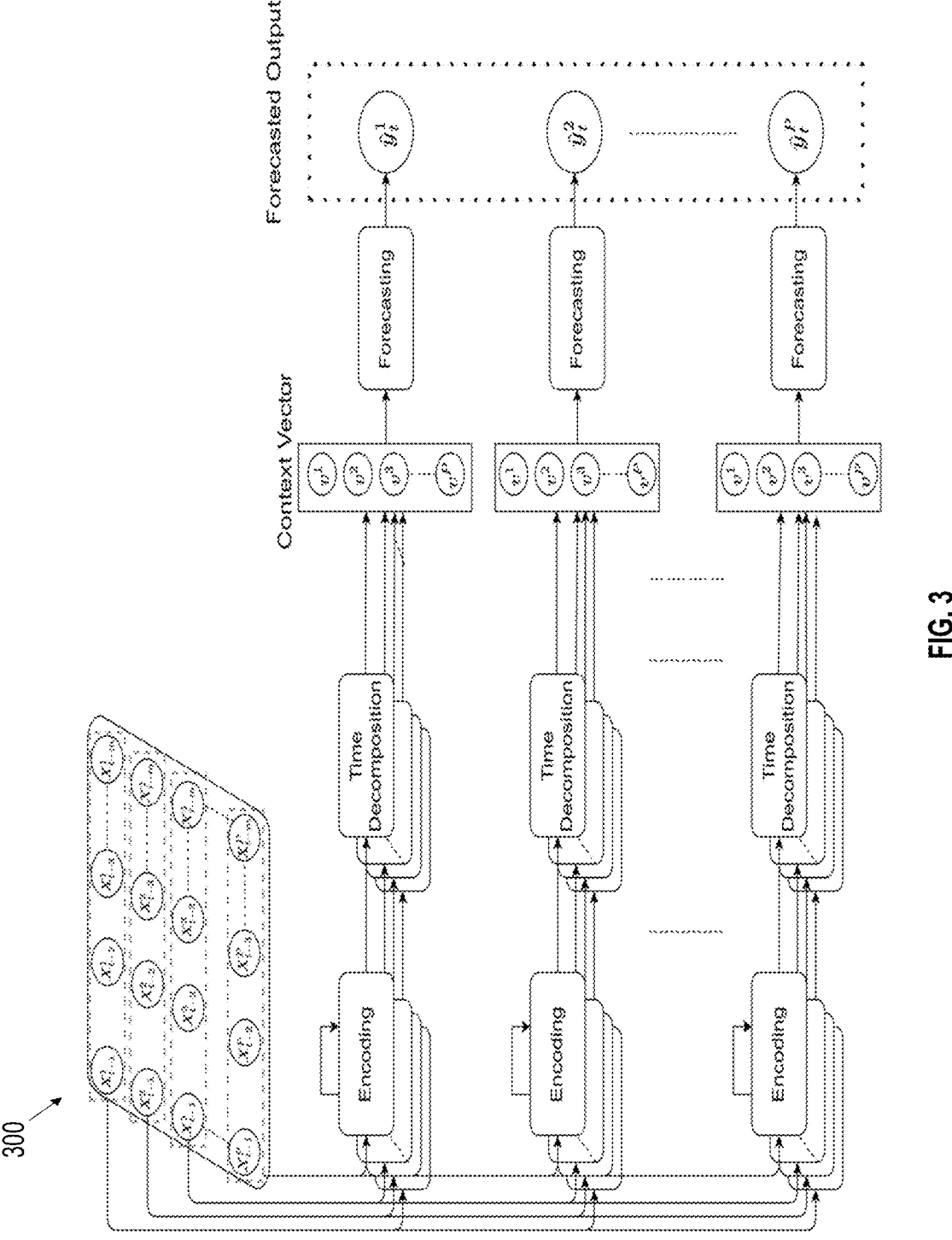
FIG. 3 is a schematic diagram to illustrate the architecture of a Deep Neural Model (DNM) for causal inference, in accordance with some embodiments of the present disclo-sure.

Referring FIG. 3, a schematic diagram (300) to illustrate the architecture of a Deep Neural Model (DNM) for causal inference, in accordance with some embodiments of the present disclosure. It would be appreciated that the DNM takes windowed/segmented data as an input for training in order to optimize/minimize a predetermined cost function. The DNM is generated based on the window length, number of variables and hyperparameters describing the number of layers. Herein, the DNM is designed to forecast the output window $$\hat{y}_t^1$$

to $$\hat{y}_t^P$$

comprising the values of all P variables for the next time instance, t given the input window comprising the previous values (t−1 to t−m) of all variables. The input window is passed through a series of network layers, namely the encoding layer, the time lag decomposition layer, and the forecasting layer to generate the output window. The encoding layer comprises a series of RNNs which project each input variable to a different dimension as an encoded input. The encoded input is then fed to the time lag decomposition layer which applies 1-D convolution across the length of the window. Convolutions are performed to generate a single vector representation of the input variable which is named as the 'context vector'. Context vectors from all input layers are concatenated and passed through a forecasting layer which utilizes multilayer perceptron (MLP) to predict the output window. The DNM is capable of learning the non-stationarity in the input multivariate time-series data. The cost function for the DNM can be one of mean squared error (MSE), root mean squared error (RMSE) or mean absolute error (MAE) along with an additional causal penalty term. The weights and biases in the DNM are updated during model training such that the value of the cost function is as low as possible.

Figure 4:
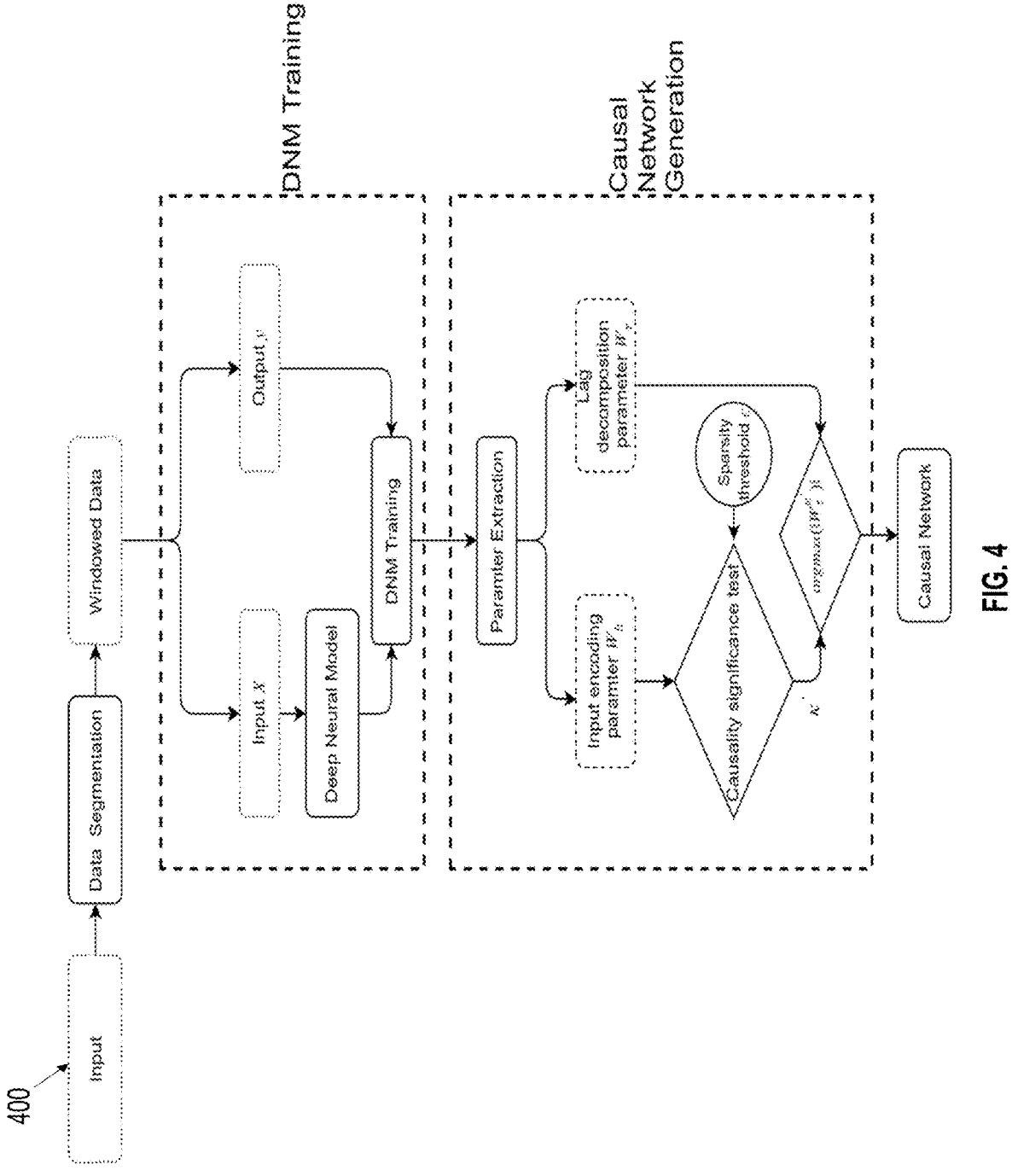
FIG. 4 is a flow chart to illustrate a method for causal network learning, in accordance with some embodiments of the present disclosure.

Referring FIG. 4, a flow diagram (400) illustrating the working of the causal network learning module of the system (100), in accordance with some embodiments of the present disclosure. Herein, the causal network learning module of the system (100) comprises data segmentation, model training and causal network generation steps.

The input multivariate time-series data is obtained from the faulty sensors comprising P number of variables recorded for time instances T. The system (100) divides input data into windows of fixed length m along the time-axis (temporal dimension). Further, each window, is split into source X and target y wherein the source consists of values of the variables at previous time steps, i.e., $$[X_{t-1}^i, X_{t-2}^i, ..., X_{t-m}^i]$$

for each variable $X^i$ and the target y comprises values of the variables at the present timestep, i.e., $$y_t^i$$

for each variable $y^i$.

The DNM is trained to minimize an error metric for forecast with sparsity inducing penalty in the causal parameters. The error metric can be one of root mean squared error (RMSE), mean squared error (MSE), and mean absolute error (MAE). The causal parameters include the input encoding layer ($W_h$) and lag decomposition layer ($W_\tau$) parameters. This allows relative difference in magnitude of parameters among causally significant and insignificant variables and their respective temporal lags. The penalty is tuned by hyperparameters $\lambda_1$ and $\lambda_2$. The resulting loss function is defined with mean squared error (MSE) as error metric as follows:

$$\mathcal{L} = \sum_{t=m}^{T}\sum_{j=1}^{P}\left(\hat{y}_t^j - y_t^j\right)^2 + \lambda_1\sum_{\kappa=1}^{P}\|W^\kappa\|_2 + \lambda_2\sum_{\kappa=1}^{P}\sum_{\tau=1}^{m}\|W_\tau^\kappa\|_2 \tag{1}$$

The loss function in equation (1) is nonconvex in nature and difficult to converge. The gradients for the loss function are computed via backpropagation through time (BPTT) and network parameters are updated using stochastic proximal gradient descent (SPGD) with adaptive learning rate. Proximal gradient descent ensures sparsity in causal parameters which is important for causal interpretation and adaptive learning rate allows better convergence. It is to be noted that after network training, the system (100) is configured to extract causal information from the network parameters.

The DNM input encoding layer and time lag decomposition layer parameters, $W_h$ and $W_\tau$ respectively, are extracted from the trained network. $W_h$ is used to interpret significant causal connections among variables while $W_\tau$ is to identify most significant temporal lag for a causal relationship. Hyperparameter causal network density (e) is tuned to get the threshold and significant causal variables $\kappa'$. The causality significance test to identify $\kappa'$ is defined as:

$$\kappa' = \arg(W_h^\kappa > Q_\epsilon(W_h^\kappa)) \tag{2}$$

wherein $Q_\epsilon(x)$ represents percentile range (PR) from $\epsilon$ to 1.

The most significant temporal lag $\tau'$ for a causal variable $\kappa'$ is identified as the lag with maximum contribution in the time lag decomposition layer.

$$\tau = \arg\max\left(\left\|W_\tau^{\kappa'}\right\|_F\right) \tag{3}$$

wherein, $\|\cdot\|_F$ is frobenius norm of a matrix.

The set of causal connections and temporal lags obtained from equations (2) & (3) are used to generate the causal network of the detected process fault. The faulty variables are represented as nodes while the set of causal connections generated from Eq. (2) serve as directed edges between the nodes, representing causality and direction of fault propagation. The temporal lags are obtained for each edge from Eq. (3) represent time delays in fault propagation. A weight matrix is representation of causal connections generated from Eq (2), where each value represents the magnitude of causal contribution between two variables is also generated as an output.

Referring FIG. 5, to illustrate a processor-implemented method (500) for causal network learning and identifying one or more root cause variables and one or more fault propagation paths for faults in industrial processes is provided.

Initially, at the step (502), receiving, via an input/output interface, a multivariate time-series data for one or more sensors from a plurality of sources, wherein the multivariate time-series data comprising a plurality of variables recorded for a plurality of time instances. The plurality of sources is associated with the manufacturing and process industries that include iron and steel, power, cement, semiconductor, oil and gas refineries, fine chemicals, etc. comprising a sensor database, a laboratory database, an environment database, and a maintenance database.

At the next step (504), preprocessing the received multivariate time-series data using a plurality of pre-processing techniques to remove noise and spurious values, imputing/interpolating missing values of the plurality of received data and resampling the received multivariate time series data to a uniform frequency.

At the next step (506), detecting at least one fault in the pre-processed multivariate time series data and a plurality of fault variables responsible for the at least one fault using a fault detection and localization technique. The fault detection technique comprises one of the statistical, machine learning and deep learning techniques including Principal component analysis (PCA), Mahalanobis distance, isolation forest, elliptical envelope, k-nearest neighbors, multilayer perceptron, long short term memory autoencoder (LSTM-AE), and convolution network autoencoder (CNN-AE) while the fault localization technique comprises one of complete decomposition contribution (CDC), leave-one-variable-out (LOVO) and reconstruction error based technique.

At the next step (508), dividing the preprocessed multivariate time-series data of the plurality of fault variables along the time axis into a plurality of windows of a predefined dimension. Each of the plurality of windows is further split into one or more sources and a target variable. The source comprising the multivariate time series data corresponding to one or more previous time instances. The target comprising the multivariate time series data corresponding to a current time instance.

At the next step (510), training a deep neural network for causal inference using each of the plurality of windows and a stochastic proximal gradient descent (SPGD) technique with an adaptive learning rate. The deep neural model (DNM) comprising one or more encoding layers and one or more time lag decomposition layers with one or more penalized causal parameters and one or more forecasting layers.

At the next step (512), extracting one or more encoding parameters from one or more encoding layers of the deep neural model and one or more time lag decomposition parameters from one or more time lag decomposition layers of the deep neural model.

At the next step (514), computing causality scores for each of the one or more sources corresponding to the target variable using Frobenius norm of one or more encoding parameters to obtain causality scores for one or more source-target variable pairs.

At the next step (516), applying a causality significance test on the computed one or more causality scores for one or more source-target variable pairs to identify a threshold value to select one or more source-target variable pairs having a causality score above the identified threshold in the multivariate time-series data.

At the next step (518), determining a temporal lag based on a contribution to the lag decomposition parameters corresponding to each of the one or more selected source-target variable pairs having a causality score above the threshold.

At the next step (520), generating a causal structure of fault propagation from the selected one or more source-target variable pairs and the determined temporal lags.

At the last step (522), identifying one or more root cause variables and one or more fault propagation paths based on traversing the generated causal structure.

Experiment

The industrial Tennessee Eastman process (TEP) is considered for the case study. Operating data from the process is sent to FDD module which detected a nonstationary fault and 9 candidate faulty variables viz. X4, X7, X8, X13, X18, X19, X20, X45 and X50 are localized using the LSTM-AE technique. The identified candidate variables are passed as input to the CNL module. In the CNL module, the input multivariate data is segmented into overlapping time-windows of length 10. The windowed data is further split into source and target instances and fed to the DNM for modelling the data. The network is trained using MSE as the error metric and LSTMs for the encoding layer because of their ability to model complex temporal interactions. Weights for the encoding and time-decomposition layers are penalized and the network is trained with SPGD algorithm with an adaptive learning rate in the range $10^{-6}$ to $10^{-2}$. The causal network for the fault is generated by extracting parameters from the trained DNM and performing steps as shown in FIG. 5. Causality significance test from Eq. (2) is applied on the encoding layer parameters to identify causal relationships between variables. The result is represented as a weight matrix shown in FIG. 6 where each value in the matrix represents the magnitude of significant causal contribution between source and target variables.

Figure 6:
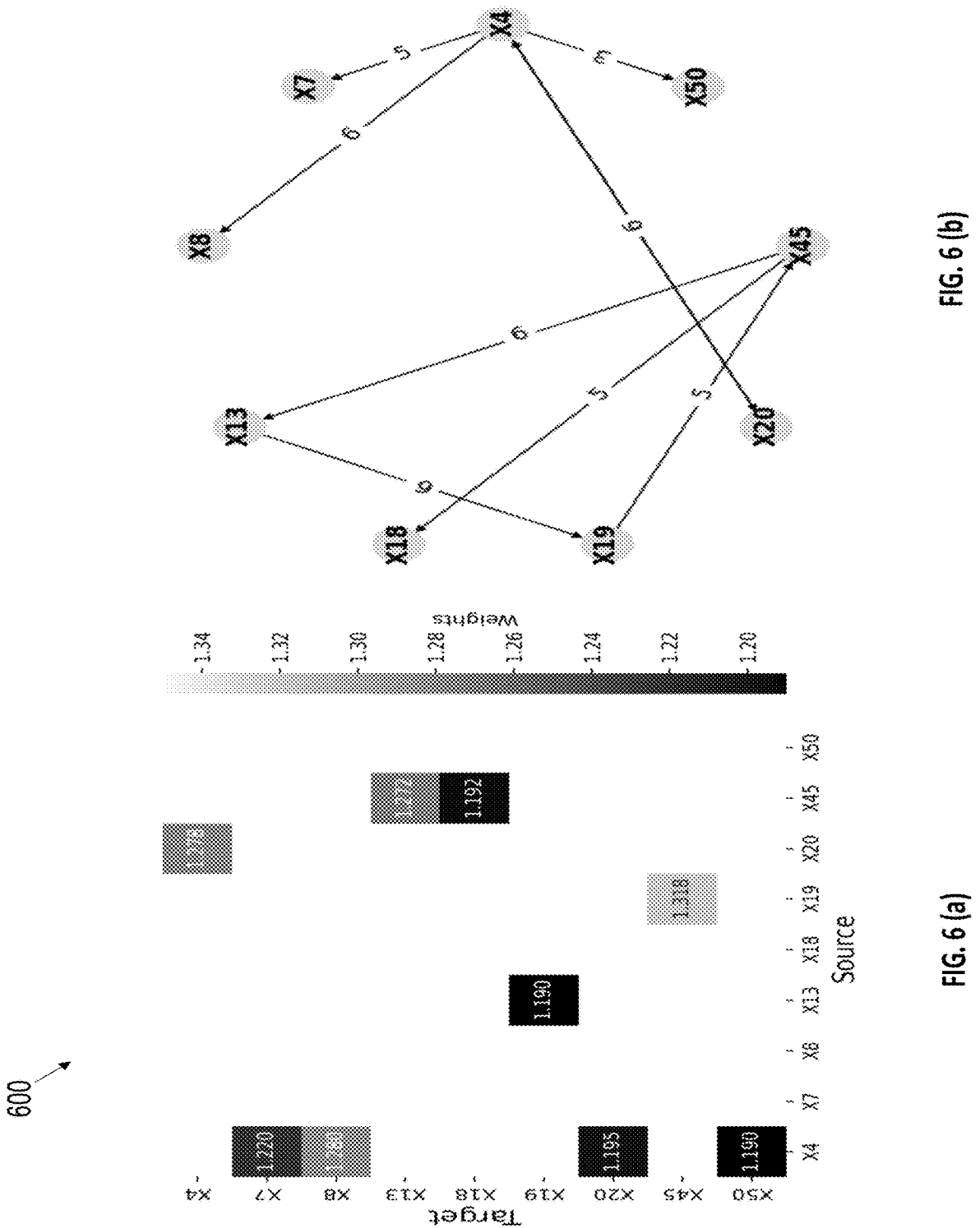
FIG. 6 shows the results obtained from CNL module for the fault in the Tennessee Eastman Process.

Significant lags for the causal connections are identified as per Eq. (3). The inferred set of causal connections and temporal lags are graphically represented as a directed causal network graph where each edge signifies the direction of causal connection and the edge weight represents the time delay in for each interaction. FIG. 6 shows the causal network obtained from CNL module for the fault in the TEP. Causal connections between various candidate variables are identified along with time lagged information. The generated causal network is sent to the RCI module for detection of fault propagation paths and root cause variables.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of learning causal networks for faults in nonlinear and nonstationary industrial processes and equipment. A method and system for causal network learning and identifying one or more root cause variables and one or more fault propagation paths for faults in industrial processes and equipment is provided.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software modules located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method for causal network learning and identifying one or more root cause variables and corresponding one or more fault propagation paths for faults in industrial processes comprising steps of:

receiving, via an input/output interface, a multivariate time-series data of one or more sensors from a plurality of sources, wherein the multivariate time-series data comprising a plurality of variables recorded for a plurality of time instances;

pre-processing, via one or more hardware processors, the received multivariate time-series data using a plurality of pre-processing techniques to remove noise and spurious values, imputing/interpolating missing values, and resampling the received multivariate time series data to a uniform frequency;

detecting, via the one or more hardware processors, at least one fault in the pre-processed multivariate time series data and a plurality of fault variables responsible for the at least one fault using a fault detection and diagnosis technique;

dividing, via one or more hardware processors, the pre-processed multivariate time-series data of the plurality of fault variables along the time axis into a plurality of windows of a predefined dimension, wherein each of the plurality of windows is further split into one or more sources and a target variable;

training, via the one or more hardware processors, a deep neural network for causal inference using each of the plurality of windows and a stochastic proximal gradient descent (SPGD) technique with an adaptive learning rate;

extracting, via the one or more hardware processors, one or more encoding parameters from one or more encoding layers of the deep neural network and one or more time lag decomposition parameters from one or more time lag decomposition layers of the deep neural network;

computing, via the one or more hardware processors, causality scores for each of the one or more sources corresponding to the target variable using Frobenius norm of one or more encoding parameters to obtain causality score for one or more source-target variable pairs;

applying, via the one or more hardware processors, a causality significance test on the computed one or more causality scores to identify a threshold value to select one or more source-target variable pairs having a causality score above the identified threshold in the multivariate time-series data;

determining, via the one or more hardware processors, a temporal lag based on a contribution to the lag decomposition parameters corresponding to each of the one or more selected source-target variable pairs having a causality score above the threshold;

generating, via the one or more hardware processors, a causal structure of fault propagation from the selected one or more source-target variable pairs and the determined temporal lags;

predicting a fault score for current time instance and one or more future time instances, wherein in response to detecting a fault using the predicted fault score, fault localization, generation of a casual structure and identification of one or more root cause variables is performed in advance;

identifying, via the one or more hardware processors, the one or more root cause variables and one or more fault propagation paths for faults in industrial processes based on traversing the generated causal structure;

identifying one or more faulty data instances to identify a plurality of faulty variables responsible for the detected fault by one of a visual inspection and by traversing the casual network using one or more graph traversal techniques;

sending the plurality of faulty variables and data corresponding to the plurality of faulty variables to the casual network to learn the casual network of the one or more fault propagation paths; and recommending one or more corrective actions related to one of a shutdown, a maintenance and optimization to one or more operators of the industrial processes based on the identified root cause variables and fault propagation paths.

2. The processor-implemented method of claim 1, wherein the deep neural network comprising one or more encoding layers and one or more time lag decomposition layers with one or more penalized causal parameters and one or more forecasting layers.

3. The processor implemented method of claim 1, wherein the fault detection and diagnosis technique comprise one of a statistical, machine learning and deep learning techniques comprising a principal component analysis (PCA), a Mahalanobis distance, an isolation forest, an elliptical envelope, a K-nearest neighbors, a multilayer perceptron, a long-short term memory autoencoder (LSTM-AE), a convolution network autoencoder (CNN-AE).

4. The processor-implemented method of claim 1, wherein the one or more source variables comprising the multivariate time series data corresponding to one or more previous time instances.

5. The processor-implemented method of claim 1, wherein the target variable comprising the multivariate time series data corresponding to a current time instance.

6. The processor implemented method of claim 1, wherein one or more causal parameters are penalized while training the deep neural network to isolate one or more source-target variable pairs having a causality score above the identified threshold in the multivariate time-series data.

7. The processor implemented method of claim 1, wherein the non-convex optimization function is trained using SPGD algorithm with adaptive learning.

8. A system for causal network learning and identifying one or more root cause variables and corresponding one or more fault propagation paths for faults in industrial processes comprising:

an input/output interface to receive a multivariate time-series data of one or more sensors from a plurality of sources, wherein the multivariate time-series data comprising a plurality of variables recorded for a plurality of time instances, a memory in communication with the one or more hardware processors, wherein the one or more hardware processors are configured to execute programmed instructions stored in the memory to:

preprocess the received multivariate time-series data using a plurality of pre-processing techniques to remove noise and spurious values, imputing/interpolating missing values and resampling the received multivariate time series data to a uniform frequency;

detect at least one fault in the pre-processed multivariate time series data and a plurality of fault variables responsible for the at least one fault using a fault detection and diagnosis technique;

divide the preprocessed multivariate time-series data of the plurality of fault variables along the time axis into a plurality of windows of a predefined dimension, wherein each of the plurality of windows is further split into one or more sources and a target variable;

train a deep neural network for causal inference using each of the plurality of windows and a stochastic proximal gradient descent (SPGD) technique with an adaptive learning rate;

extract one or more encoding parameters from one or more encoding layers of the deep neural network and one or more time lag decomposition parameters from one or more time lag decomposition layers of the deep neural network;

compute causality scores for each of the one or more sources corresponding to the target variable using Frobenius norm of one or more encoding parameters to obtain one or more source-target variable pairs;

apply a causality significance test on the computed one or more causality scores to identify a threshold value to select one or more source-target variable pairs having a causality score above the identified threshold in the multivariate time-series data;

determine a temporal lag based on a contribution to the time lag decomposition parameters corresponding to each of the one or more selected source-target variable pairs having a causality score above the threshold; and generate a causal structure of fault propagation from the selected one or more source-target variable pairs and the determined temporal lags;

predict a fault score for current time instance and one or more future time instances, wherein in response to detecting a fault using the predicted fault score, fault localization, generation of a casual structure and identification of one or more root cause variables is performed in advance;

identify the one or more root cause variables and one or more fault propagation paths for faults in industrial processes based on traversing the generated causal structure;

identify one or more faulty data instances to identify a plurality of faulty variables responsible for the detected fault by one of a visual inspection and by traversing the casual network using one or more graph traversal techniques;

send the plurality of faulty variables and data corresponding to the plurality of faulty variables to the casual network to learn the casual network of the one or more fault propagation paths; and recommend one or more corrective actions related to one of a shutdown, a maintenance and optimization to one or more operators of the industrial processes based on the identified root cause variables and fault propagation paths.

9. The system of claim 8, wherein the deep neural network comprising one or more encoding layers and one or more time lag decomposition layers with one or more penalized causal parameters and one or more forecasting layers.

10. The system of claim 8, wherein the fault detection and diagnosis technique comprise one of a statistical, machine learning and deep learning techniques comprising a principal component analysis (PCA), a Mahalanobis distance, an isolation forest, an elliptical envelope, a K-nearest neighbors, a multilayer perceptron, a long-short term memory autoencoder (LSTM-AE), a convolution network autoencoder (CNN-AE).

11. The system of claim 8, wherein the one or more source variables comprising the multivariate time series data corresponding to one or more previous time instances.

12. The system of claim 8, wherein the target variable comprising the multivariate time series data corresponding to a current time instance.

13. The system of claim 8, wherein one or more causal parameters are penalized while training the deep neural network to isolate one or more source-target variable pairs having a causality score above the identified threshold in the multivariate time-series data.

14. The system of claim 8, wherein the non-convex optimization function is trained using SPGD algorithm with adaptive learning.

15. A non-transitory computer readable medium storing one or more instructions which when executed by one or more processors on a system, cause the one or more processors to perform method comprising:

receiving, via an input/output interface, a multivariate time-series data of one or more sensors from a plurality of sources, wherein the multivariate time-series data comprising a plurality of variables recorded for a plurality of time instances;

preprocessing the received multivariate time-series data using a plurality of pre-processing techniques to remove noise and spurious values, imputing/interpolating missing values and resampling the received multivariate time series data to a uniform frequency;

detecting at least one fault in the pre-processed multivariate time series data and a plurality of fault variables responsible for the at least one fault using a fault detection and diagnosis technique;

dividing the preprocessed multivariate time-series data of the plurality of fault variables along the time axis into a plurality of windows of a predefined dimension, wherein each of the plurality of windows is further split into one or more sources and a target variable;

training a deep neural network for causal inference using each of the plurality of windows and a stochastic proximal gradient descent (SPGD) technique with an adaptive learning rate;

extracting one or more encoding parameters from one or more encoding layers of the deep neural network and one or more time lag decomposition parameters from one or more time lag decomposition layers of the deep neural network;

computing causality scores for each of the one or more sources corresponding to the target variable using Frobenius norm of one or more encoding parameters to obtain one or more source-target variable pairs;

applying a causality significance test on the computed one or more causality scores to identify a threshold value to select one or more source-target variable pairs having a causality score above the identified threshold in the multivariate time-series data;

determining a temporal lag based on a contribution to the time lag decomposition parameters corresponding to each of the one or more selected source-target variable pairs having a causality score above the threshold; and generating a causal structure of fault propagation from the selected one or more source-target variable pairs and the determined temporal lags;

predicting a fault score for current time instance and one or more future time instances, wherein in response to detecting a fault using the predicted fault score, fault localization, generation of a casual structure and identification of one or more root cause variables is performed in advance;

identifying the one or more root cause variables and one or more fault propagation paths for faults in industrial processes based on traversing the generated causal structure;

identifying one or more faulty data instances to identify a plurality of faulty variables responsible for the detected fault by one of a visual inspection and by traversing the casual network using one or more graph traversal techniques sending the plurality of faulty variables and data corresponding to the plurality of faulty variables to the casual network to learn the casual network of the one or more fault propagation paths; and recommending one or more corrective actions related to one of a shutdown, a maintenance and optimization to one or more operators of the industrial processes based on the identified root cause variables and fault propagation paths.

16. The non-transitory computer readable medium of claim 15, wherein the deep neural network comprising one or more encoding layers and one or more time lag decomposition layers with one or more penalized causal parameters and one or more forecasting layers.

17. The non-transitory computer readable medium of claim 15, wherein the fault detection and diagnosis technique comprise one of a statistical, machine learning and deep learning techniques comprising a principal component analysis (PCA), a Mahalanobis distance, an isolation forest, an elliptical envelope, a K-nearest neighbors, a multilayer perceptron, a long-short term memory autoencoder (LSTM-AE), a convolution network autoencoder (CNN-AE).

18. The non-transitory computer readable medium of claim 15, wherein the one or more source variables comprising the multivariate time series data corresponding to one or more previous time instances.

19. The non-transitory computer readable medium of claim 15, wherein the target variable comprising the multivariate time series data corresponding to a current time instance.

20. The non-transitory computer readable medium of claim 15, wherein one or more causal parameters are penalized while training the deep neural network to isolate one or more source-target variable pairs having a causality score above the identified threshold in the multivariate time-series data.

* * * * *